L. O. PARKER.
SPARK GAP APPARATUS.
APPLICATION FILED MAY 13, 1918.
1,428,856.
Patented Sept. 12, 1922.
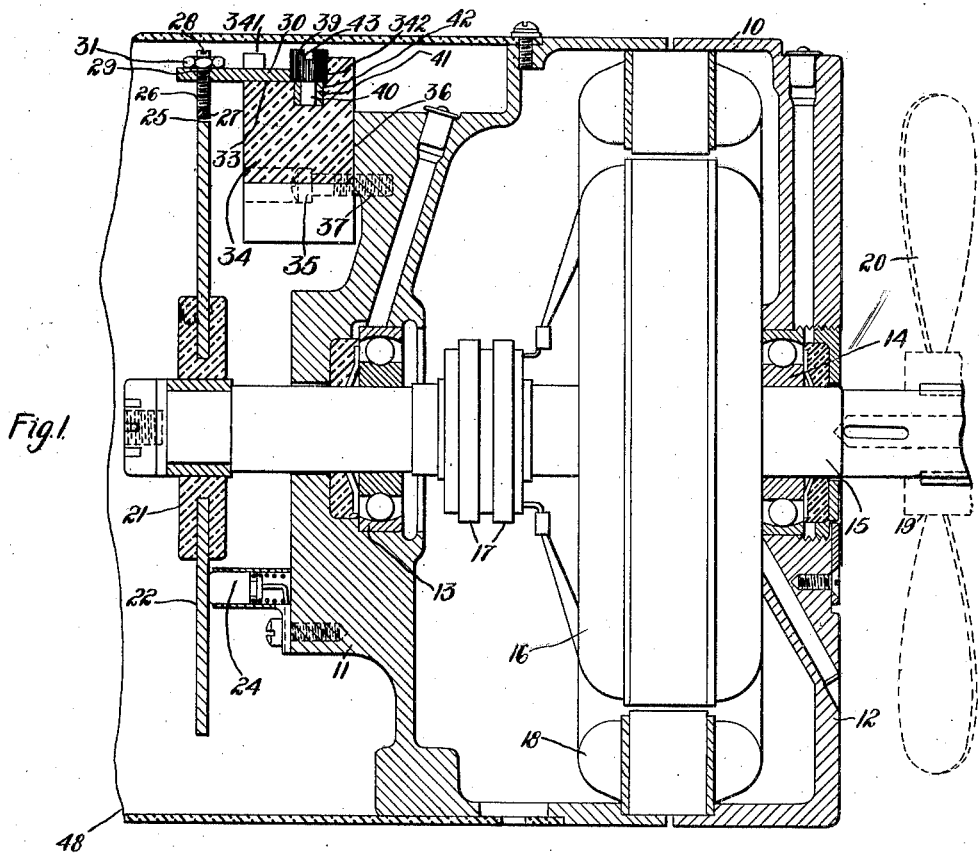
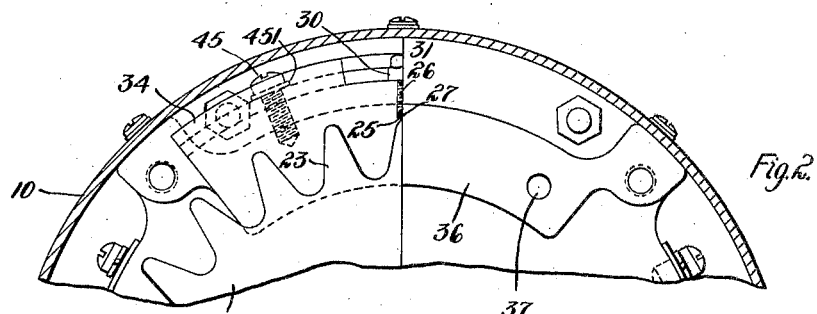
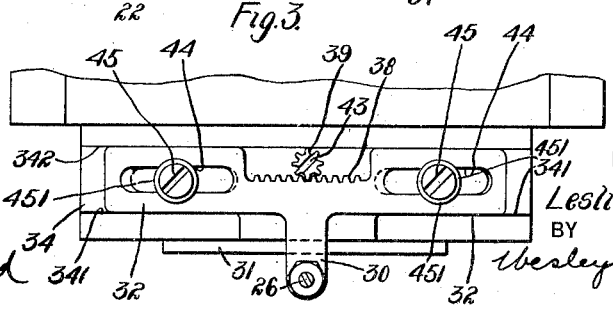
WITNESSES:
J. T. Hurml
E. L. Greenewald
INVENTOR
Leslie O. Parker
BY
Wesley I. Carr
ATTORNEY Patented Sept. 12, 1922.

1,428,856

UNITED STATES PATENT OFFICE.

LESLIE O. PARKER, OF SWISSVALE, PENNSYLVANIA, ASSIGNOR TO WESTINGHOUSE ELECTRIC & MANUFACTURING COMPANY, A CORPORATION OF PENNSYLVANIA.

SPARK-GAP APPARATUS.

Application filed May 13, 1918. Serial No. 234,131.

*To all whom it may concern:*

Be it known that I, LESLIE O. PARKER, a citizen of the United States, and a resident of Swissvale, in the county of Allegheny and State of Pennsylvania, have invented a new and useful Improvement in Spark-Gap Apparatus, of which the following is a specification.

My invention relates to wireless apparatus and particularly to that class of apparatus which employs two relatively movable electrodes, one of which is stationary and the other of which is a rotatable toothed disk the teeth of the latter moving past the tip of the stationary electrode to make and break a circuit across a gap therebetween.

In order that the make and break shall occur at the peak of the voltage wave, it is necessary that the electrodes shall be relatively adjustable to permit them to be correctly positioned with relation to each other. This adjustment is usually effected by moving the normally stationary electrode circumferentially of the rotatable electrode.

The object of my invention is to provide a spark-gap structure in which the normally stationary electrode shall be supported by, and insulated from, the end bracket of an alternator in a simple and inexpensive manner, and so arranged that it is readily adjustable on its support and accessible for inspection and repairs.

The above and other objects and the novel features of my invention will be apparent from the following description, taken in connection with the drawing in which Figure 1 is a longitudinal sectional view of a high-frequency wireless generator equipped with a spark-gap structure embodying my invention, and Figs. 2 and 3 are detail views of parts of the generator and the mounting for the stationary electrode.

Referring to the drawing, the spark-gap apparatus is shown mounted on a high-frequency generator for wireless telegraphy but it will, of course, be understood that such apparatus may be mounted on some other support and independently of the generator. The generator shown comprises a main frame 10 and end brackets 11 and 12 provided with suitable bearings 13 and 14 for supporting the shaft 15 that carries the rotating field magnet 16 and slip rings 17 within the machine frame. A stationary armature winding 18 is so mounted within the main part 10 of the frame as to surround the rotating field magnet.

One end 19 of the shaft 15 projects through the end bracket 12 and carries the propeller blades 20, by means of which the shaft and parts mounted thereon are driven. The blades 20 constitute the driving means for the alternator, since the latter is designed for use on an airplane and to be wind-driven, but it will be clear that other driving means may be employed when the machine is used on the ground. The other end of the shaft 15 projects through the end bracket 11 and has a hub 21 secured thereto to rotate therewith. The hub 21 is preferably made of bakelite or a similar non-conducting material and is molded about the inner edge of a metal disk-electrode 22 which is provided with a series of peripheral teeth 23. A brush 24 is mounted on the outer side of the end bracket 11 and is spring-pressed against the inner face of the disk 22.

The rotatable electrode 22 is designed to make and break an oscillation circuit across the gap 25 between the end of an adjacent tooth 23 and the stationary electrode 26 to produce a train of sparks across such gap, as the teeth are moved successively into cooperative relation with such stationary electrode. The number of sparks per second and the tone of the oscillation circuit are determined by the number of teeth on the disk 22 and the speed of rotation of the latter. The electrode 26 is screw-threaded and has a tungsten tip 27 at one end and a slot 28 at the other end to receive the end of a screw driver, whereby the said electrode may be radially adjusted in a threaded opening 29 of a supporting plate 30. The opening 29 is disposed in the plane of the disk electrode 22 and, accordingly, the electrode 26 is readily adjustable radially of the electrode and may be locked in its adjusted position by a nut 31.

The plate or arm 30 that carries the electrode 26 is provided with wings 32 which, together with the plate intermediate them, are curved circumferentially of the disk-electrode 22 to slidably fit a curved surface 33 on the upper side of a block 34 made of bakelite or similar non-conducting material. The block 34 is secured to the outer face 36 of the end bracket 11 by countersunk capscrews 35 fitting in threaded sockets 37 and insertable from the outer side of the block 34. A part of the rear edge of the curved electrode-supporting plate 30 between the wings 32 is cut away and toothed, as at 38, to provide a rack that meshes with a pinion 39 seated on the upper side of the block and having a reduced stem 40 fitting into a bushing 41 in a recess 42 in the upper side of the block 34. The pinion 39 is provided with a slot 43 to receive a screw driver, whereby the plate 30 and the electrode 26 thereon may be adjusted in either direction circumferentially of the electrode 22. The front edges of the wings 32 abut against vertical shoulders 341 on the block 34 and the rear edges of the wings 32 abut against, and are guided by, a vertical shoulder 342 on the block 34, and the pinion 39 is confined between the rack 38 and the shoulder 342.

Each of the wings 32 has a slot 44 therein to receive a screw 45 which fits a threaded socket in the insulating block 34. The electrode 26 may be secured in its adjusted position by tightening the screws 45, which are locked in place by spring washers 451. Since the normally stationary electrode is locked in its adjusted position, when it is desired to change its adjustment, it is necessary to loosen the screws 45 before the pinion 39 may be turned. A hollow cover 48 of conical or stream-line form (only partly shown) is secured to the frame 10 and encloses the end bracket 11, the spark-gap apparatus and other apparatus associated therewith.

I claim as my invention:

1. A spark-gap apparatus comprising the combination of a rotatable toothed-disc electrode, a relatively stationary electrode, means for adjusting said stationary electrode with relation to the rotatable electrode, said means comprising a plate slidable circumferentially of said rotatable electrode, and insulating and supporting means for said stationary electrode and said adjusting means, said insulating and supporting means being mounted at a distance from the axis of the rotatable electrode.

2. A spark-gap apparatus comprising the combination with a rotatable toothed disc electrode, of a relatively stationary electrode adjustable radially and circumferentially with relation to said rotatable electrode, and a fixed insulating block supporting said stationary electrode and mounted at a distance from the axis of said rotatable electrode.

3. A spark-gap apparatus comprising the combination of co-operating electrodes, one being a rotatable toothed disc and the other being relatively stationary and disposed adjacent to the periphery of the rotatable electrode, and a supporting means for the stationary electrode comprising a fixed insulating member mounted at a distance from the axis of said rotatable disc and an adjustable member on the insulating member.

4. A spark-gap apparatus comprising the combination of two co-operating electrodes, one being a rotatable toothed disc and the second being relatively stationary and disposed adjacent to the periphery of said rotatable electrode, and supporting means for the stationary electrode comprising a fixed insulating block, a plate having a face slidably supported on said block and carrying the stationary electrode, and means for adjusting said plate and electrode circumferentially of the rotatable electrode.

5. A spark-gap apparatus comprising the combination of co-operating electrodes, one consisting of a rotatable toothed circular disk and the other electrode being normally stationary and disposed adjacent to the periphery of said disk, and a supporting means for said electrode comprising a fixed block of insulating material having a curved surface, a curved rack carrying said stationary electrode and slidable on the curved surface of said block, a pinion mounted in said block for adjusting said rack and the electrode thereon in either direction circumferentially of said electrode disk, and means for securing said rack in its adjusted position.

6. A spark-gap apparatus comprising the combination of co-operating electrodes, one being rotatable and comprising a toothed metallic disc and a current-conducting member associated therewith, and the other being relatively stationary, and a supporting means for the stationary electrode mounted at a distance from the axis of said rotatable electrode comprising a member adjustable circumferentially of the rotatable member and having screw-threaded engagement with said stationary electrode, whereby the stationary electrode is adjustable circumferentially and radially of said rotatable electrode.

7. The combination with a dynamo-electric machine comprising a frame, end brackets for the frame and a shaft mounted in said end brackets, of a rotatable electrode carried by said shaft, a relatively stationary electrode disposed adjacent to the periphery of said rotatable electrode and supporting means for said stationary electrode comprising an insulating block having a curved surface, means for securing said insulating block to the outer side of one of said end brackets, a curved toothed plate slidable on said curved surface and provided with a threaded aperture opposite the periphery of said rotatable electrode to receive the stationary electrode and adapting the same to be adjusted radially of the rotatable electrode, and a pinion mounted in said block and meshing with said toothed plate, whereby the latter and the electrode thereon are adjustable in either direction circumferentially of the rotatable electrode.

8. In a spark-gap apparatus, the combination with a rotatable shaft, an insulating member mounted on said shaft, a toothed circular disc electrode mounted on said insulating member, and a current conducting member associated with said electrode, of a stationary insulating block mounted at a distance from the shaft, a supporting member mounted on said insulating member, an electrode mounted on said supporting member, means for adjusting said supporting member circumferentially of said insulating block, and means for securing said supporting member in its adjusted position.

In testimony whereof, I have hereunto subscribed my name this 30th day of April 1918.

LESLIE O. PARKER.